United States Patent [19]

Irwin

[11] Patent Number: 4,738,400

[45] Date of Patent: Apr. 19, 1988

[54] SPRAY BAR ASSEMBLY

[75] Inventor: Richard D. Irwin, Mt. Clemens, Mich.

[73] Assignee: Almo Manifold & Tool Co., Centerline, Mich.

[21] Appl. No.: 13,321

[22] Filed: Feb. 11, 1987

[51] Int. Cl.⁴ .......................... B05B 1/14; B05B 1/30; F16K 1/00; F16K 31/12

[52] U.S. Cl. .................................... 239/536; 137/883; 137/884; 137/885; 239/551; 239/555; 239/583

[58] Field of Search ............... 239/536, 550, 551, 554, 239/555, 569, 583, 600, 396; 137/883–885

[56] References Cited

U.S. PATENT DOCUMENTS

| | | | |
|---|---|---|---|
| 2,476,615 | 7/1949 | Moese | 138/117 |
| 3,771,730 | 11/1973 | Nicoloff et al. | 239/536 |
| 3,880,358 | 4/1975 | Schaming | 239/551 |
| 4,356,760 | 11/1982 | Bouteille | 91/445 |
| 4,387,739 | 6/1983 | Schaming | 239/551 X |
| 4,568,026 | 2/1986 | Baun | 239/551 |
| 4,613,078 | 9/1986 | Marshall | 239/583 X |
| 4,638,950 | 1/1987 | Collinson et al. | 239/551 |

OTHER PUBLICATIONS

On-Line Shape Measurement and Control for a 2--Stand Temper Mill, Oct. 1986, pp. 29-35.
Vidimun Shapemeter Product Brochure, Davy-Loewy, Limited, Loewy Robertson Division, (undated).
Almo® Hydraulic Control Manifolds Product, Brochure No. 765M, (undated, first published in approximately 1980).

*Primary Examiner*—Andres Kashnikow
*Assistant Examiner*—Patrick N. Burkhart
*Attorney, Agent, or Firm*—John E. Nemazi

[57] ABSTRACT

A spray bar having a plurality of nozzles and an elongated header for spraying liquid. The header is made up of a top, intermediate and bottom plate. Between the top plate and the intermediate plates are defined a plurality of independent fluid passageways coupled to individually controlled fluid operated valves having each nozzle assembly. Between the intermediate plate and the bottom plate is a liquid cavity. The nozzle are mounted in openings in the bottom plate and sealingly cooperate with the intermediate plate and extend through the liquid cavity. The flow of liquid through each of the nozzles may be independently regulated by varying a control fluid signal to enable the liquid in an application rate to be varied axially along the header.

11 Claims, 1 Drawing Sheet

FIG. 1
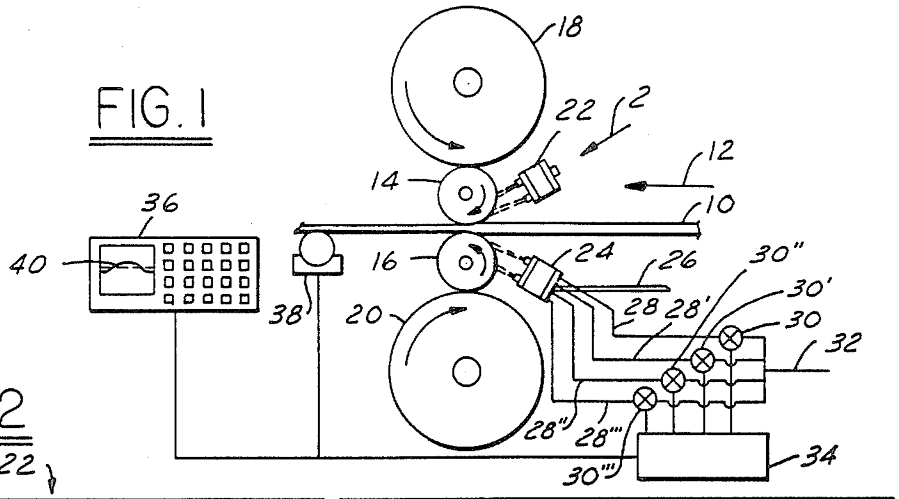
FIG. 2
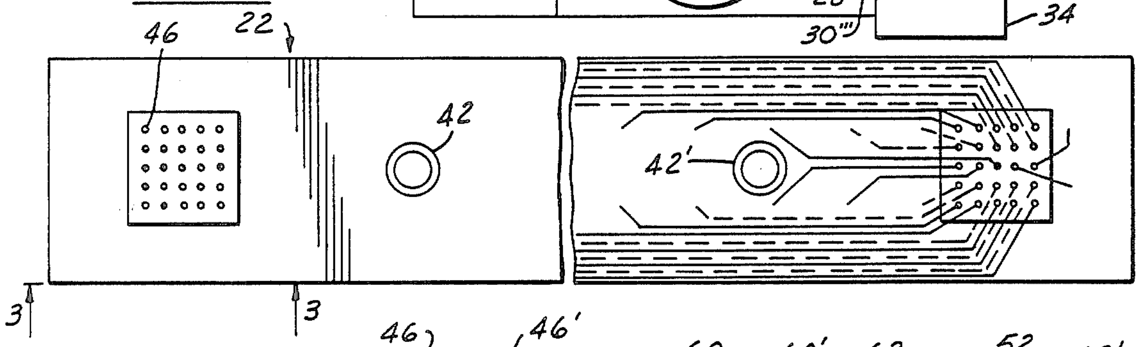
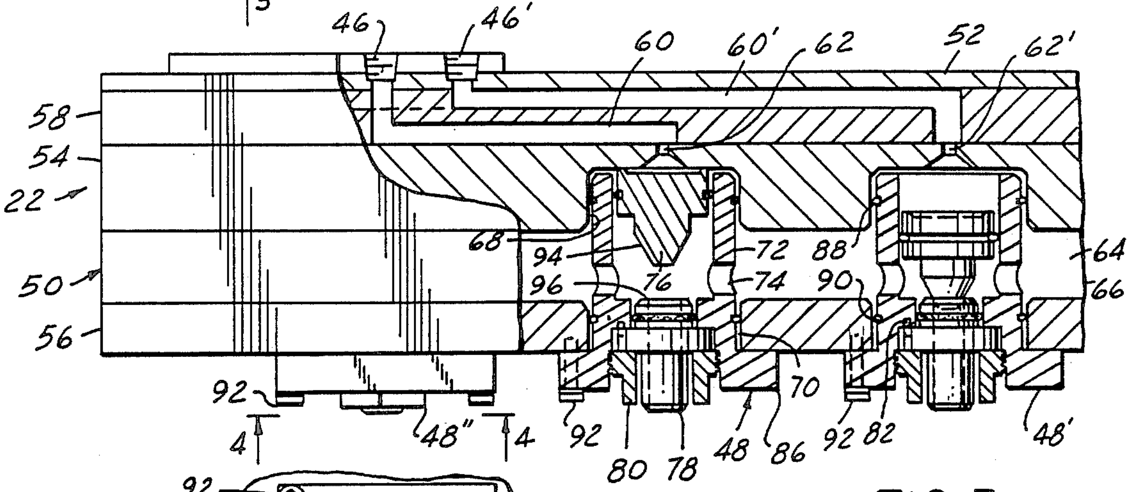
FIG. 3
FIG. 4
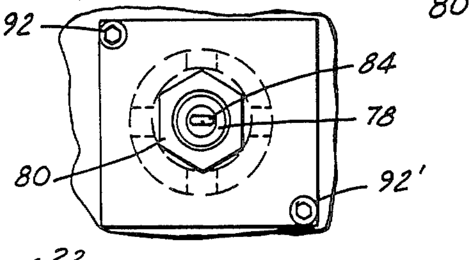
FIG. 5
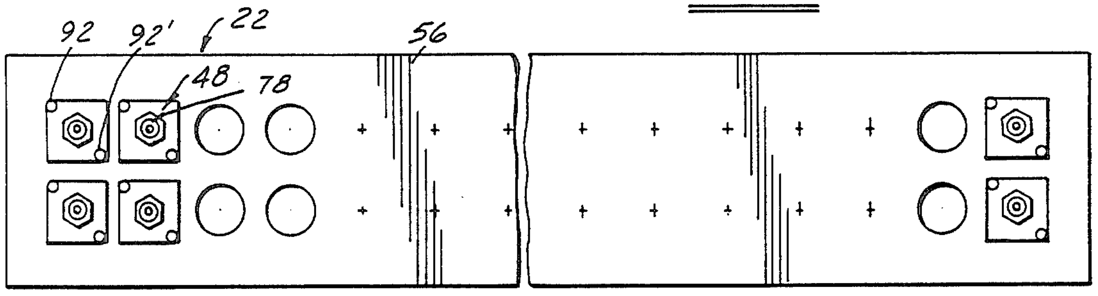

SPRAY BAR ASSEMBLY

FIELD OF INVENTION

This invention relates to the field of spray bars and more particularly to elongated spray bar assemblies having a plurality of nozzles used to apply liquid during a rolling process or the like.

BACKGROUND OF INVENTION

During the metal rolling process, spray bars are typically used to spray a coolant on the rollers or to dissipate the heat generated by rolling so that a proper operating temperature can be maintained. Depending upon the operating conditions, the amount of coolant required may vary. Spray bars have previously been developed as shown in U.S. Pat. No. 3,771,730, Nicoloff, et al, which depicts previous spray bar design. It was typically the objective of most prior spray bar designs to apply a uniform coolant spray flow area across the entire length of a roller. More recently, the advancements in computer controllers and the development of a continuous strip profile measurement devices, it was determined that many of the flatness variations in rolled sheet metal could be minimized by selectively applying varying amounts of coolant at various positions along the width of rollers which will selectively cool same.

The object of this invention is to provide a spray bar capable of providing a wide variety of liquid flow rates which can be varied both in overall rate and axially along the length of the spray bar assembly.

It is another object of the invention to provide a spray bar which is compact and has a minimum of external plumbing of coolant and control lines.

It is another object of the invention to provide a spray bar which has easily replaceable orifices and nozzle assemblies so that the spray bar can be maintained with minimum machine down-time.

A feature of the present invention is that a large number of individual nozzles having orifices of predetermined sizes can be provided in a relatively compact spray bar in order to precisely "meter" coolant flow.

An advantage of the present invention is that the entire spray bar assembly can be fabricated in a small compact leakproof unit which can withstand an occasional impact resulting from a wreck caused by the breakage of the metal strip.

SUMMARY OF INVENTION

I have developed a novel spray bar for use for applying liquid during a rolling process which has a number of nozzle assemblies for spraying liquid, each individually controlled by an internal fluid operated valve. The spray bar has an elongated header which extends along a transverse axis to which the nozzle assemblies are mounted. The spray bar header is formed of a top plate, an intermediate plate and a bottom plate. The intermediate plate lies between the top and bottom plates and has a first side engaging the top plate defining therebetween a plurality of independent fluid passageways. The second side of the fluid plate has formed thereon a plurality of sealing surfaces for mating with the nozzle assemblies. Each of the nozzle assemblies are coupled to an independent fluid passageway via a port which extends through the intermediate plate. The bottom plate which is attached to the intermediate plate and defines therebetween a liquid cavity for holding the liquid to be sprayed. The bottom plate also has plurality outlets formed therein aligned with the sealing surfaces in their intermediate plate for receiving the nozzle assemblies. The header is further provided with means for introducing liquid into the liquid cavity and means for coupling a control fluid signal to each of the independent passageways for independently regulating the fluid operated valve in each nozzle assembly. The flow of liquid through each of the nozzle assemblies may be thereby independently regulated by varying the control fluid signal enabling the liquid application rate to be varied independently from any portion of the header's length.

These objects and novel characteristics of the invention will become further apparent from a review of the accompanying drawings and detailed description of the preferred embodiment.

BRIEF DESCRIPTION OF THE DRAWINGS

FIG. 1 is a side elevational view of a metal rolling apparatus employing a pair of spray bars;

FIG. 2 is a partially cut-away plan view of a spray bar taken along Line 2 and FIG. 1;

FIG. 3 is an enlarged partial cut-away view of a spray bar taken long Line 3—3 and FIG. 2;

FIG. 4 is a bottom view of a portion of the spray bar showing a nozzle assembly; and FIG. 5 is a bottom view of the spray bar shown in FIG. 2.

BRIEF DESCRIPTION OF THE PREFERRED EMBODIMENT

Referring to the drawings, FIG. 1 shows a side elevation of a sheet metal rolling operation. A sheet of metal 10 is moving horizontally in the direction of an arrow 12 and travelling between reduction rolls 14 and 16 which are in rolling contact with the metal sheet 10 and backup rolls 18 and 20. The reduction rolls and backup rolls rotate in the directions of the respective arrows drawn thereon as the metal sheet is drawn between the reduction rolls which mechanically deforms the sheet to reduce the thickness thereof.

During the metal rolling process, there is a significant amount of heat generated wherein the metal sheet as well as the reduction rolls tend to heat up. In order to maintain constant metal sheet quality, it is necessary to cool the reduction rolls. The amount of coolant required is dependent upon the type and thickness of the metal being rolled and it is therefore necessary to vary the amount of coolant depending upon the particular situation. Also, note however that the spray bar can apply a coolant, lubricant or corrosion treatments which may be sprayed on the metal sheet before or after the rolling process.

Coolant is applied to the reduction rolls shown in FIG. 1 by spray bar 22 and 24. The spray bars are generally elongated horizontal members extending parallel to the reduction rolls and having a plurality of nozzles formed therein to spray a liquid coolant on the rolls. The coolant is supplied to the spray bar 24 by a coolant containing pipe 26, a similar pipe (not shown) supplies coolant to spray bar 22. The coolant pipe 26 provides a source of coolant for all of the nozzles in the spray bar. These nozzles are independently controlled by individual control fluid lines 28, 28' and 28'' and 28''' communicating with a fluid operated valve formed in each nozzle. For simplicity in the drawings, only four control fluid lines are shown; however, in actual practice one control fluid line will be provided for each of the nozzles in the spray bar. Control fluid lines transmit a fluid signal such as pressurized air to the nozzles in the spray bar. Each control fluid line is provided with a control valve such as solely operated control valve 30, 30', 30" and 30'''. Again, note that there will be one valve per line and only a representative number of lines and valves are shown.

The control valves are shiftable between an open and close position connecting the source of pressurized fluid 32 to control fluid lines 28. Control valves 30 are regulated by signals provided by programmable control end 34. Control end 34 may be a relay-type device or a mini-computer type device, both of which are relatively commonly used in industry today. The control 34 receives input from the operator console 36 where the information necessary to determine the average flow rate will be input. The control 34 will also receive inputs from a shaped meter 38 which determines the relative flatness of the rolled metal sheet 10. Shape meters are commercially available which determine the relative flatness by making simultaneous measurements transversely across the moving metal strip. Controller 34 will automatically process the shape information received from the shape meter 38 and vary the flow of liquid emitted from the two spray bars to continuously and automatically adjust the coolant flow in order to maintain proper formed metal flatness. For example, the sample shape curve 40 shown on the operator console indicates that the center of the metal sheet is slightly higher than the edges. To correct this deviation from a perfectly flat metal sheet, more coolant may be added to the center portion of the upper spray bar 22 while less coolant would be applied to the center portion of the lower spray bar 24. While not shown a set of fluid control lines and fluid control valves which control upper spray bar 22 are also regulated by control 34.

The spray bar is shown in more detail in FIGS. 2–5. FIG. 2 is a partially cut-away plane view showing two coolant inlets 42 and 44 which serve as a means for introducing fluids into the spray bar and internal liquid cavity. Also shown in the FIG. 2 plan view are the array of control fluid inlets 46 which serve as a means for coupling the control fluid signals to each of the internal independent passageways within the spray bar.

As shown in FIG. 3 the spray bar is formed of a plurality of nozzles 48 and a manifold assembly 50. Each of the nozzle assemblies 48 are designed to spray liquid coolant and each is individually controlled by a fluid-operated valve internally formed therein. The manifold assembly is generally elongated in shape and having a transverse axis which is generally orientated generally parallel to the axis of the reduction roll which it is associated with. The spray bar is comprised of a top plate 52 and intermediate plate 54 and bottom plate 56 in the embodiment of the invention shown in the drawings. A circuit plate 58 is provided between the top plate 52 and intermediate plate 54. Between the top plate and the intermediate plate lie a plurality of independent fluid passageways 60 and 60' affecting control fluid inlets 46 and 46' to two different nozzle assemblies. The embodiment of the invention shown in FIG. 3 which is provided with a fluid circuit plate 58, the independent fluid passageways are formed on two different planes defined by the opposite sides of the fluid circuit plate and thereby enabling the independent fluid passageways to be fabricated for a large number of nozzles simply in using relatively direct flow paths. The independent flow passageways are formed by machining a slot in one of the two plates which are to be joined together thereby providing a path for fluid flow. The intermediate plate has formed therein a plurality of ports 60 and 60 prime projecting therethrough for connecting the fluid passageway 60 and 60 prime to the fluid operated valve formed in the nozzle assembly. When the fluid circuit plate 58 is used between the top plate 52 and the intermediate plate 54, it is necessary to provide throughholes extending through the fluid circuit plate as shown to connect the control fluid inlet 46 to the fluid circuit passageway or to connect the fluid circuit passageway to the port in the intermediate plate.

Between the intermediate plate and the bottom plate is a fluid-tight liquid cavity 64. The liquid cavity is in communication with coolant inlet 42 which extends through the top plate, the fluid circuit plate and the intermediate plate. The liquid cavity can be alternatively formed by machining a pocket in either the intermediate plate or the bottom plate or using a spacer on 66 having an enlarged opening therein to define a liquid cavity when same is between the intermediate plate and the bottom plate. The intermediate plate is provided with a plurality of sealing surfaces 68 for sealingly engaging the nozzle. In the embodiment shown, the sealing surfaces are generally cylindrical pockets formed in the intermediate plate into which the port 62 projects. Aligned with the sealing surface 68 in the intermediate plate is an outlet 70 formed in the bottom plate which also sealingly cooperates with the nozzle 48. Sealing surface 68 and outlet 70 are cylindrical openings machined in the intermediate and bottom plates respectively and are sized to sealingly cooperate with the tubular body 72 of nozzle assembly 48.

Nozzle tubular body 72 is provided with a first end for sealingly engaging the intermediate plate and a second end for sealingly engaging the bottom plate and having in there between a central region exposed to liquid cavity 64 and having formed therethrough inlet ports 74. Within the first end of the tubular body is a flow contrl valve spool 76 which sealingly cooperates with the tubular body 72 and is shiftable axially relative thereto between an open position shown in nozzle 48 and in a closed position in nozzle 48 prime. The nozzle assembly is further provided with an outlet orifice which cooperates with the second end of the body and communicates with the inlet port 74 when the valve spool is in the open position and is isolated from the inlet port when the valve spool is in the closed position.

The embodiment of the nozzle shown in FIG. 3 is provided with a removable orifice 78 retained in place by nut 80. The orifice 78 is held in place by a dowel 82 or other alignment means in order to maintain proper orifice nozzle orientation. As shown in FIG. 4, orifice 78 may be provided with an elongated opening 84 so as to develop an elongated liquid spray pattern. Nozzle 48 is further provided with a mounting flange 86 radially projecting from the second end of the tubular body for cooperating with the lower plate 56. The nozzle sealingly engages the bottom plate and the intermediate plate along the cylindrical surfaces between the nozzle and sealing surface 68 and outlet 70. "O" rings 88 and 90 are provided to achieve a liquid-tight seal. The nozzle may be bolted or otherwise removably attached to the base plate by threaded fasteners 92 and 92'. Ideally, the cylindrical pocket defining sealing surface 68 is slightly deeper than required so that the depth of the sealing pocket will not be critical to achieve the proper sealing. The spray bar manifold and nozzle so constructed while the nozzle assembly is to be readily changed for maintenance and repair.

In operation, the liquid in the liquid cavity 64 is under some pressure higher than atmospheric so that when valve spool 76 is in the open position, liquid will be projected generally outwardly from the spray bar through opening 84. The nozzle will be open as long as valve spool 76 is in the upward position as shown in nozzle 48. The spool will be so oriented so long as the pressure in the liquid chamber 64 is greater than the pressure in the fluid signal line 60 when it is desired to stop the spray of liquid from a nozzle. The pressurized fluid signal is provided in the fluid passageway communicating with the nozzle assembly causing the valve spool to shift to the closed position as shown in nozzle 48'. Valve spool 76 is provided with a tapered conical point 94 which sealingly cooperates with a circular seat area 96 in orifice 78.

In the embodiment of the invention shown there are two rows of nozzles extending across the elongated manifold. The present inventon allows a large number of nozzles to be used so that flow can be finally controlled. It is possible to have other nozzles orientated on two inch centers so that with the two rows nozzle a 48-inch spray bar would have 48 nozzles. Preferably, each row of nozzles is provided with a different flow rate orifice so that maximum flow variation is achievable. For example, 48-inch spray bar having two rows of 24 nozzles on two-inch centers could be fabricated having one row of nozzles capable of delivering three gallons per minute and one row of nozzles capable of delivering six gallons per minute. The flow for any two nozzle pair making up an axial segment of the spray bar assembly could be varied from three, six or nine gallons per minute by opening either one or both of the nozzles. Using the spray bar assembly described, it is possible to achieve very good control of reduction roll temperature so that flatness of the rolled metal sheet can be continuously monitored and adjusted. It is also very important to note that when narrow sheets of metal are being rolled only the required axial length of the manifold need be activated thereby minimizing unnecessary coolant flow to the ends of the reductionable where no metal is being processed.

Ideally, the spray bar header is fabricated from a number of flat steel plates which are furnace brazed together to form a single strong contact unit. It is also possible, however, to retain the series of plates together using a series of threaded fasteners. If the header is assembled using the furnace brazing technique, it is important to carefully position with the plates to maintain proper alignment of the internal cavities and passageways formed therein.

It will also be understood, of course, that while the form of the invention herein shown and described constitutes a preferred embodiment of the invention, it is not intended to illustrate all possible forms thereof. It will also be understood that the words used are words of description rather than limitation and various changes may be made without departing from the spirit and scope of the invention disclosed.

I claim:

1. A spray bar for applying liquid for a rolling process or the like comprising:
   - a plurality of nozzle assemblies for spraying liquid, each of which is individually controlled by a fluid operated valve integrally formed therein; and
   - an elongated header having a transverse axis said header comprising:
     - a top plate;
     - an intermediate plate having a first and second side, a first side for sealingly cooperating with the top plate and defining therebetween a plurality of independent fluid passageways and a second side having formed thereon a plurality of sealing surfaces for cooperating with the nozzle assemblies, each of which is coupled with an independent fluid passageway by a plurality of ports extending through said intermediate plate;
     - a bottom plate sealingly cooperating with the intermediate plate to define therebetween a liquid cavity, said bottom plate having formed therein a plurality of outlets aligned with the sealing surfaces in the intermediate plate for receiving a nozzle assembly therein which sealingly cooperate with the bottom plate and the sealing surface of the intermediate plate;
   - means for introducing liquid within the liquid cavity; and
   - means for coupling a control fluid signal to each of the independent passageways for independently regulating the fluid operated valve in each nozzle assembly;
   - wherein the flow of liquid through each of the nozzle assemblies may be independently regulated by varying each of the control fluid signals in order to enable the liquid application rate to vary axially along the header.

2. The invention of claim 1 wherein said nozzle assemblies are further provided with an inlet port in and an axial outlet port the flow of liquid therebetween being controlled by said fluid operated valve, said inlet port communicating with the manifold liquid cavity and said outlet orifice oriented to spray liquid generally outwardly from the spray bar.

3. The invention of claim 1 wherein said nozzle assembly further comprises;
   - a tubular body having a first and second end and a central region therebetween having formed therein a radial inlet port;
   - a fluid operative valve spool sealingly cooperating with the first end of the body and axially shiftable relative thereto between an opened and closed position in response to the control fluid signal; and
   - an outlet orifice cooperating with the second end of the body and communicating with the radial inlet port to spray liquid therefrom when the valve spool is in the open position and isolated therefrom when the valve spool is in the closed position.

4. The invention of claim 3 wherein the intermediate plate sealing surface for cooperation with the nozzle assemblies comprises cylindrical pockets formed in the intermediate plate for telescopically and sealingly receiving a nozzle assembly therein.

5. The invention of claim 4 wherein the nozzle assemblies further comprise a mounting flange radially projecting from the tubular body adjacent the second end thereof for removably attaching the nozzle to the manifold bottom plate.

6. The invention of claim 1 wherein the top plate and the intermediate plate are integrally bonded together to form a rigid one-piece unit.

7. The invention of claim 1 wherein the top plate, intermediate plate and bottom plate are integrally bonded together to form a rigid one-piece unit.

8. The invention of claim 1 further comprising a circuit plate lying between the top plate and the intermediate plate having formed therebetween at least a portion of said independent fluid passageways.

9. The invention of claim 8 wherein a portion of the independent fluid passageways are formed between the top plate and the circuit plate and a portion are formed between the circuit plate and the intermediate plate.

10. The invention of claim 9 wherein the top plate and the intermediate plate are integrally bonded together to form a rigid one-piece unit.

11. The invention of claim 9 wherein the top plate, intermediate plate and bottom plate are integrally bonded together to form a rigid one-piece unit.

* * * * *